US012764660B2

(12) United States Patent
Hong

(10) Patent No.: US 12,764,660 B2
(45) Date of Patent: Oct. 13, 2026

(54) DRX-BASED COMMUNICATION METHOD FOR POWER SAVING IN SIDELINK COMMUNICATION

(71) Applicants: HYUNDAI MOTOR COMPANY, Seoul (KR); KIA CORPORATION, Seoul (KR)

(72) Inventor: Ui Hyun Hong, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 416 days.

(21) Appl. No.: 18/223,744

(22) Filed: Jul. 19, 2023

(65) Prior Publication Data

US 2023/0388925 A1 Nov. 30, 2023

Related U.S. Application Data

(63) Continuation-in-part of application No. PCT/KR2022/001661, filed on Jan. 28, 2022.

(30) Foreign Application Priority Data

Feb. 4, 2021 (KR) ........................ 10-2021-0016330
Jan. 28, 2022 (KR) ........................ 10-2022-0013448

(51) Int. Cl.

| | |
|---|---|
| ***H04W 52/02*** | (2009.01) |
| ***H04L 1/18*** | (2023.01) |
| ***H04W 72/0446*** | (2023.01) |
| ***H04W 72/40*** | (2023.01) |
| ***H04W 76/14*** | (2018.01) |
| ***H04W 76/28*** | (2018.01) |

(52) U.S. Cl.
CPC ........... *H04W 52/0216* (2013.01); *H04L 1/18* (2013.01); *H04W 52/02* (2013.01); *H04W 72/0446* (2013.01); *H04W 72/40* (2023.01); *H04W 76/14* (2018.02); *H04W 76/28* (2018.02)

(58) Field of Classification Search
None
See application file for complete search history.

(56) References Cited

U.S. PATENT DOCUMENTS

2020/0029318 A1 1/2020 Guo
2020/0288286 A1 9/2020 Hwang et al.
2020/0396040 A1 12/2020 Miao
2021/0022139 A1 1/2021 Shin et al.
2022/0070964 A1 * 3/2022 Yang ..................... H04W 72/20
(Continued)

OTHER PUBLICATIONS

Wikipedia on Table (Information) (Year: 2021).*
(Continued)

*Primary Examiner* — Ayaz R Sheikh
*Assistant Examiner* — Christopher R Davis
(74) *Attorney, Agent, or Firm* — Morgan Lewis & Bockius LLP

(57) ABSTRACT

A DRX-based communication method for power saving in sidelink communication is disclosed. A method for operation of a base station includes the steps of: transmitting information of PSFCH intervals to a terminal; determining an SL DRX cycle on the basis of the PSFCH intervals; and transmitting information of the SL DRX cycle to the terminal, wherein the SL DRX cycle is determined such that a PSFCH according to the PSFCH intervals is located within an on-duration of the SL DRX cycle.

10 Claims, 6 Drawing Sheets

(56) References Cited

U.S. PATENT DOCUMENTS

| | | | | |
|---|---|---|---|---|
| 2022/0103300 | A1* | 3/2022 | Sun | H04W 72/23 |
| 2022/0225469 | A1* | 7/2022 | Lee | H04L 1/1812 |

OTHER PUBLICATIONS

3GPP TS 38.213 Physical layer procedures for control (Year: 2021).*

3GPP, "Physical layer procedures for NR sidelink", 3GPP TSG RAN WG1 Meeting #98bis, R1-1910925, Chongqing, China, Oct. 14-20, 2019, 6 pages.

3GPP, "Remaining Details on Mode 1 Resource Allocation", 3GPP TSG RAN WG1 #100-e, R1-2000851, e-Meeting, Feb. 24-Mar. 6, 2020, 7 pages.

3GPP, "Discussion on physical layer design considering sidelink DRX operation", 3GPP TSG RAN WG1 #103-e, R1-2007897, E-Meeting, Oct. 26-Nov. 13, 2020, 15 pages.

3GPP, "Summary of email discussion [702][SLe] High-level principles for SL DRX", 3GPP TSG-RAN WG2 #113-e, R2-2101727, E-meeting, Jan. 2021, 85 pages.

International Search dated May 18, 2022 cited in International Patent Application No. PCT/KR2022/001661 (w/English translation).

"WID revision: NR sidelink enhancement," 3GPP TSG RAN Meeting #88e Electronic Meeting, Jun. 29 through Jul. 3, 2020 (RP-201385).

"Resource allocation for sidelink power saving," 3GPP TSG RAN WG1 #104-e e-Meeting, Jan. 25 through Feb. 5, 2021 (R1-2101790).

"FL summary for AI 8.11.2.1—resource allocation for power saving," 3GPP TSG RAN WG1 #103-e e-Meeting, Oct. 26 through Nov. 13, 2020 (R1-2009584).

* cited by examiner

DRX-BASED COMMUNICATION METHOD FOR POWER SAVING IN SIDELINK COMMUNICATION

CROSS-REFERENCE TO RELATED APPLICATION

The present application is a continuation-in-part of currently pending International Patent Application No. PCT/KR2022/001661, filed Jan. 28, 2022, which claims priority to Korean Patent Application No. 10-2021-0016330, filed Feb. 4, 2021, and Korean Patent Application No. 10-2022-0013448, filed Jan. 28, 2022, the entire contents of which is incorporated herein for all purposes by this reference.

BACKGROUND OF THE PRESENT DISCLOSURE

Field of the Present Disclosure

The present disclosure relates to a sidelink communication technique, and more particularly, to a technique for communication based on sidelink discontinuous reception (SL DRX).

DESCRIPTION OF RELATED ART

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. Sidelink communication may be performed using configured grant (CG) resources. The CG resources may be periodically configured, and periodic data (e.g., periodic sidelink data) may be transmitted using the CG resources.

Meanwhile, in a sidelink resource allocation procedure, a terminal may consider operations for power saving. For example, the terminal may perform a discontinuous reception (DRX) operation to save power. The terminal may operate in a wake-up mode in an on-duration within a DRX cycle. The terminal operating in the wake-up mode may perform a monitoring operation to receive signals. When it is determined that there is no data unit to be transmitted to the terminal, an operation mode of the terminal may transition from the wake-up mode to a sleep mode. The above-described DRX operation may be applied to a Uu link and/or a sidelink. According to the DRX operation, power consumption of the terminal may be reduced.

In sidelink communication, the terminal may transmit feedback information (e.g., hybrid automatic repeat request (HARQ) response) according to a physical sidelink feedback channel (PSFCH) periodicity. However, when the DRX operation is performed on the sidelink, feedback information may not be transmitted and received according to the DRX cycle.

The information disclosed in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

The present disclosure is directed to providing a method and an apparatus for configuring a sidelink discontinuous reception (SL DRX) operation in consideration of a PSFCH periodicity.

An operation method of a base station, according to various exemplary embodiments of the present disclosure for achieving the above-described objective, may include: transmitting, to a terminal, information of a physical sidelink feedback channel (PSFCH) periodicity; determining a sidelink (SL) discontinuous reception (DRX) cycle based on the PSFCH periodicity; and transmitting information on the SL DRX cycle to the terminal, wherein the SL DRX cycle is determined so that a PSFCH according to the PSFCH periodicity is located within an on-duration of the SL DRX cycle.

A mapping relationship between the PSFCH periodicity and the SL DRX cycle may be configured, and the SL DRX may be determined based on the mapping relationship.

The operation method may further include: transmitting, to the terminal, information on a table indicating a mapping relationship between the PSFCH periodicity and the SL DRX cycle.

The SL DRX cycle may be set equal to the PSFCH periodicity or set to a multiple by N of the PSFCH periodicity, and N may be a rational number.

The PSFCH periodicity may be 1 slot, 2 slots, 4 slots, or X slots, and X may be a natural number of 5 or more.

The operation method may further include: transmitting, to the terminal, information indicating that multiplexing of hybrid automatic repeat request (HARQ) responses is allowed and information indicating a number of HARQ responses multiplexed on one PSFCH.

The SL DRX cycle may be set as a product of the PSFCH periodicity and a number of HARQ responses multiplexed on one PSFCH.

An operation method of a terminal, according to various exemplary embodiments of the present disclosure for achieving the above-described objective, may include: receiving, from a base station, information of a physical sidelink feedback channel (PSFCH) periodicity; receiving, from the base station, information on a sidelink (SL) discontinuous reception (DRX) cycle determined based on the PSFCH periodicity; and performing a SL DRX operation based on the SL DRX cycle, wherein the SL DRX cycle is determined so that a PSFCH according to the PSFCH periodicity is located within an on-duration of the SL DRX cycle.

A mapping relationship between the PSFCH periodicity and the SL DRX cycle may be configured, and the SL DRX may be determined based on the mapping relationship.

The SL DRX cycle may be set equal to the PSFCH periodicity or set to a multiple by N of the PSFCH periodicity, and N may be a rational number.

The PSFCH periodicity may be 1 slot, 2 slots, 4 slots, or X slots, and X may be a natural number of 5 or more.

The SL DRX cycle may be set as a product of the PSFCH periodicity and a number of HARQ responses multiplexed on one PSFCH.

An operation method of a terminal, according to various exemplary embodiments of the present disclosure for achieving the above-described objective, may include: receiving physical sidelink feedback channel (PSFCH) configuration information from a base station; determining a sidelink (SL) discontinuous reception (DRX) cycle based on a PSFCH periodicity indicated by the PSFCH configuration information; and performing a SL DRX operation based on the SL DRX cycle, wherein the SL DRX cycle is determined so that a PSFCH according to the PSFCH periodicity is located within an on-duration of the SL DRX cycle.

The PSFCH configuration information may include information on a table representing a mapping relationship between the PSFCH periodicity and the SL DRX cycle, and the SL DRX cycle may be determined based on the mapping relationship.

The SL DRX cycle may be set equal to the PSFCH periodicity or set to a multiple by N of the PSFCH periodicity, and N may be a rational number.

The PSFCH configuration information may include information indicating that multiplexing of hybrid automatic repeat request (HARQ) responses is allowed and information indicating a number of HARQ responses multiplexed on one PSFCH, and the SL DRX cycle may be set as a product of the PSFCH periodicity and the number of HARQ responses multiplexed on the one PSFCH.

According to an exemplary embodiment of the present disclosure, a SL DRX cycle may be set in consideration of a PSFCH periodicity. For example, the SL DRX cycle may be set so that a PSFCH according to the PSFCH periodicity is located within an on-duration of the SL DRX cycle. Accordingly, a terminal performing a SL DRX operation may receive feedback information through the PSFCH within the on-duration. That is, in sidelink communication supporting the SL DRX operation, transmission and reception of feedback information can be efficiently performed, and power consumption of the terminal can be reduced.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
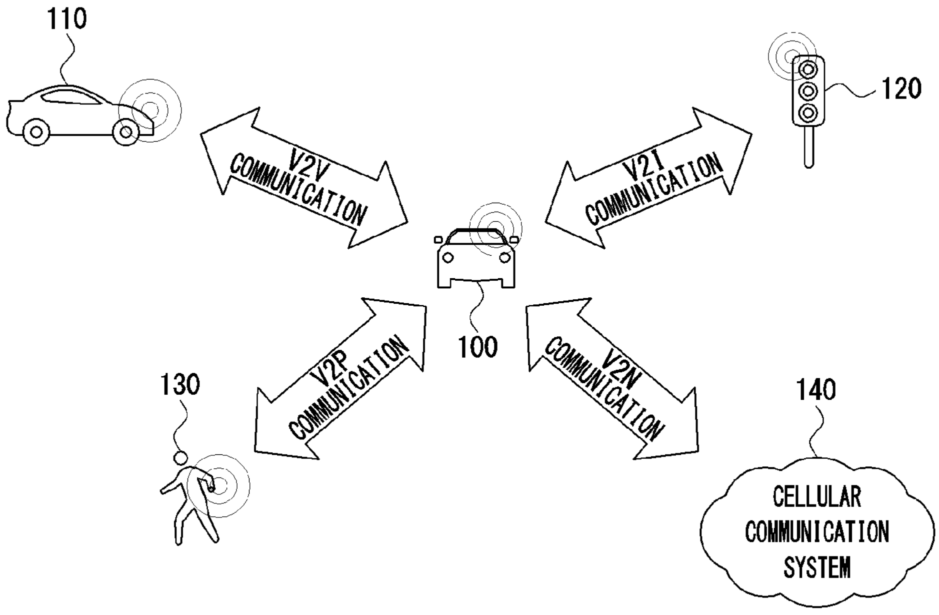
FIG. 1 is a conceptual diagram illustrating V2X communication scenarios.

It may be understood that the appended drawings are not necessarily to scale, presenting a somewhat simplified representation of various features illustrative of the basic principles of the present disclosure. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present disclosure(s) will be described in conjunction with exemplary embodiments, it will be understood that the present description is not intended to limit the present disclosure(s) to those exemplary embodiments. On the contrary, the present disclosure(s) is/are intended to cover not only the exemplary embodiments, but also various alternatives, modifications, equivalents and other embodiments, which may be included within the spirit and scope of the present disclosure as defined by the appended claims.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term “and/or” means any one or a combination of a plurality of related and described items.

In exemplary embodiments of the present disclosure, “at least one of A and B” may refer to “at least one of A or B” or “at least one of combinations of one or more of A and B”. In addition, “one or more of A and B” may refer to “one or more of A or B” or “one or more of combinations of one or more of A and B”.

In exemplary embodiments of the present disclosure, '(re)transmission' may refer to 'transmission', 'retransmission', or 'transmission and retransmission', '(re)configuration' may refer to 'configuration', 'reconfiguration', or 'configuration and reconfiguration', '(re)connection' may refer to 'connection', 'reconnection', or 'connection and reconnection', and '(re)access' may refer to 'access', 're-access', or 'access and re-access'.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the present disclosure, to facilitate the entire understanding of the present disclosure, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
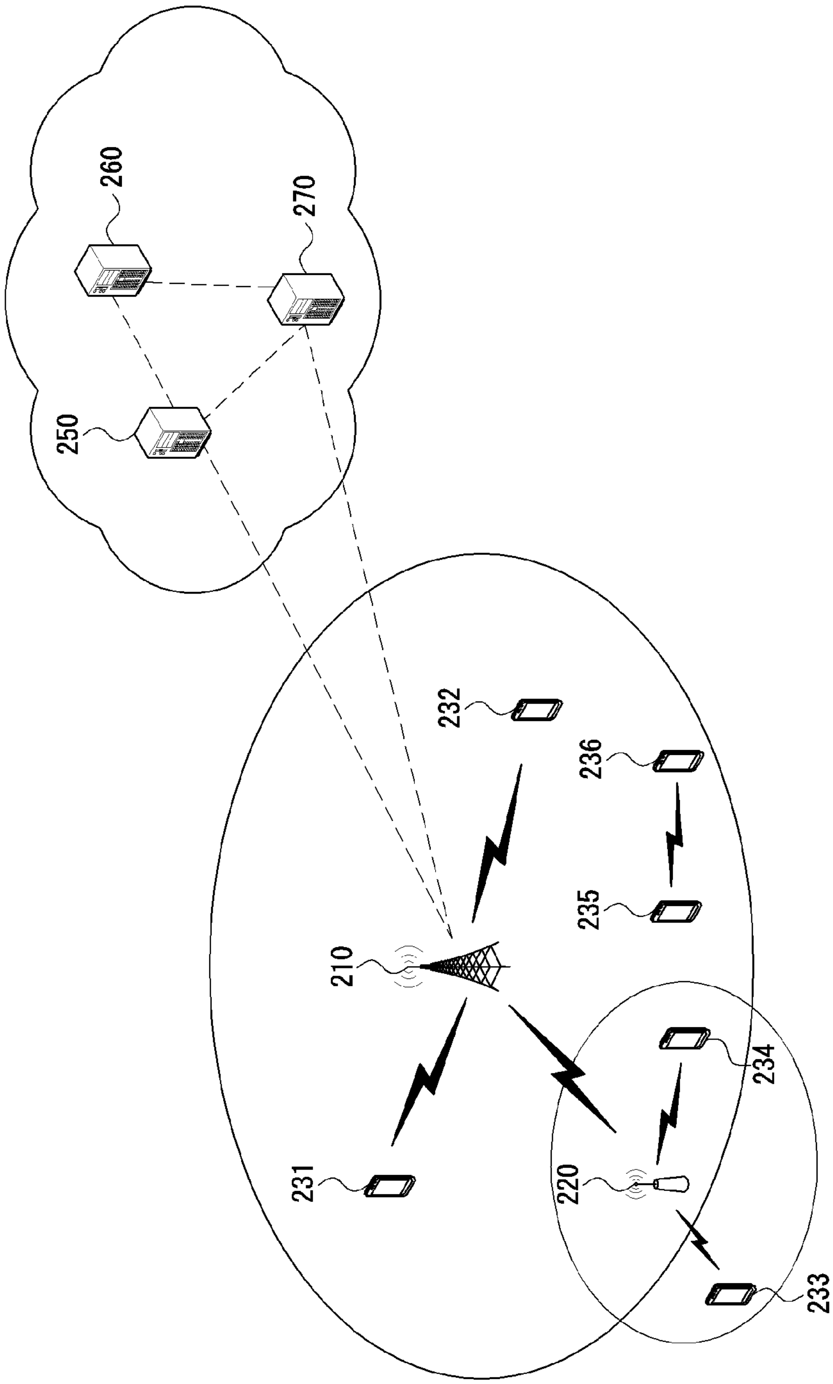
FIG. 2 is a conceptual diagram illustrating an exemplary embodiment of a cellular communication system.

FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231, 232, 233, 234, 235 and 236, and the like. The UEs 231, 232, 233, 234, 235 and 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) including the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) including the cellular communication system may be configured as follows.

Figure 3:
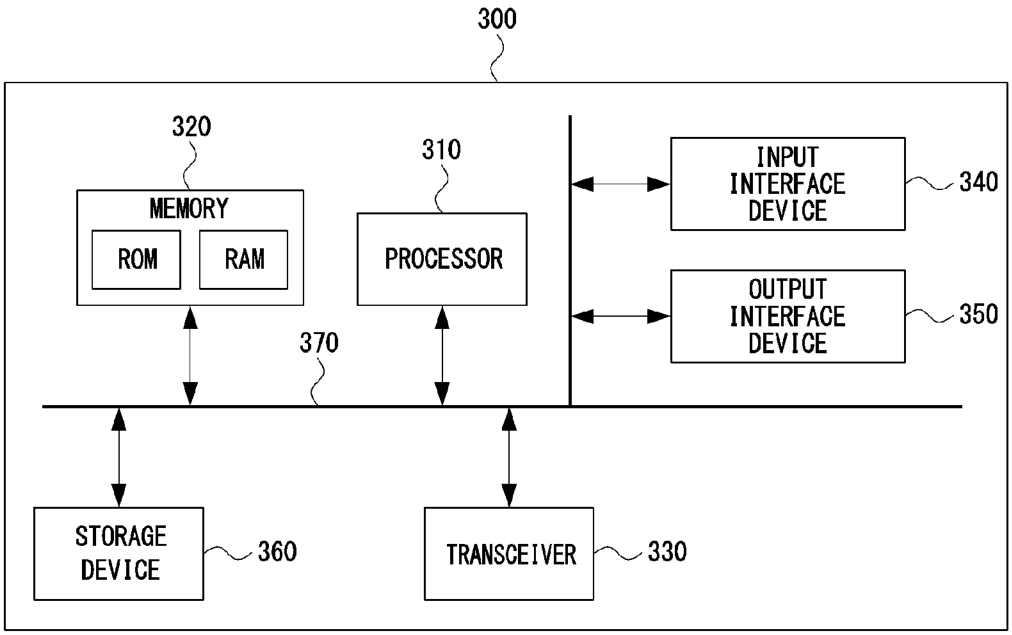
FIG. 3 is a conceptual diagram illustrating an exemplary embodiment of a communication node constituting a cellular communication system.

FIG. 3 is a conceptual diagram illustrating an exemplary embodiment of a communication node constituting a cellular communication system.

As shown in FIG. 3, a communication node 300 may include at least one processor 310, a memory 320, and a transceiver 330 connected to a network for performing communications. Also, the communication node 300 may further include an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may include at least one of read-only memory (ROM) and random access memory (RAM).

Herein, the processor 310 and the memory 320 may be implemented as separate semiconductor circuits. Alternatively, the processor 310 and the memory 320 may be implemented as a single integrated semiconductor circuit. The processor 310 may embody one or more processor(s).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231, 232, 233, 234, 235 and 236 and the relay 220, and may transmit signals received from the UEs 231, 232, 233, 234, 235 and 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231, 232, 233, 234, 235 and 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
|---|---|---|
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
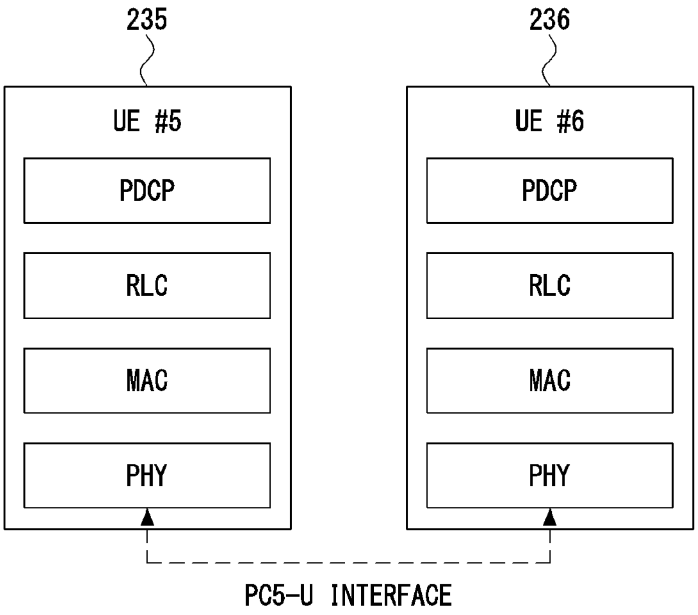
FIG. 4 is a block diagram illustrating an exemplary embodiment of a user plane protocol stack of a UE performing sidelink communication.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may include a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
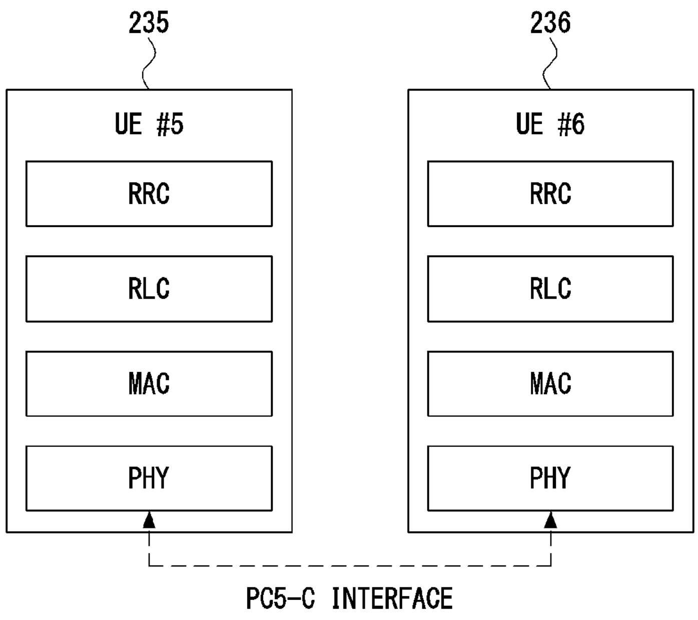
FIG. 5 is a block diagram illustrating various exemplary embodiments of a control plane protocol stack of a UE performing sidelink communication.
Figure 6:
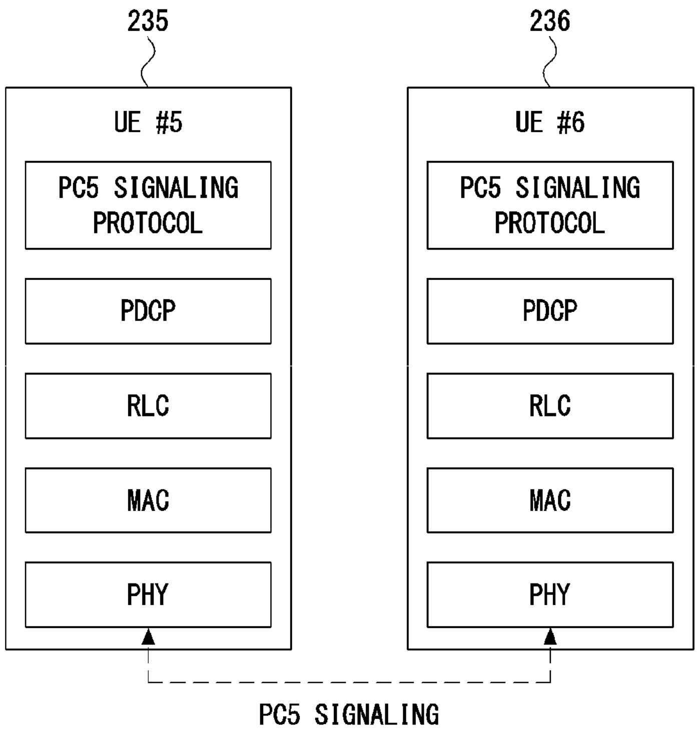
FIG. 6 is a block diagram illustrating various exemplary embodiments of a control plane protocol stack of a UE performing sidelink communication.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIG. 5 and FIG. 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
|---|---|
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, sidelink communication methods will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments, signaling may be one or a combination of two or more of higher layer signaling, MAC signaling, and physical (PHY) signaling. A message used for higher layer signaling may be referred to as a 'higher layer message' or 'higher layer signaling message'. A message used for MAC signaling may be referred to as a 'MAC message' or 'MAC signaling message'. A message used for PHY signaling may be referred to as a 'PHY message' or 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell-specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

The sidelink communication may be performed based on a single-SCI scheme or a multi-SCI scheme. When the single-SCI scheme is used, data transmission (e.g., sidelink data transmission, sidelink-shared channel (SL-SCH) transmission) may be performed based on one SCI (e.g., 1st-stage SCI). When the multi-SCI scheme is used, data transmission may be performed using two SCIs (e.g., 1st-stage SCI and 2nd-stage SCI). The SCI(s) may be transmitted on a PSCCH and/or a PSSCH. When the single-SCI scheme is used, the SCI (e.g., 1st-stage SCI) may be transmitted on a PSCCH. When the multi-SCI scheme is used, the 1st-stage SCI may be transmitted on a PSCCH, and the 2nd-stage SCI may be transmitted on the PSCCH or a PSSCH. The 1st-stage SCI may be referred to as 'first-stage SCI', and the 2nd-stage SCI may be referred to as 'second-stage SCI'. A format of the first-stage SCI may include a SCI format 1-A, and a format of the second-stage SCI may include a SCI format 2-A and a SCI format 2-B.

The 1st-stage SCI may include or more information elements among priority information, frequency resource assignment information, time resource assignment information, resource reservation period information, demodulation reference signal (DMRS) pattern information, 2nd-stage SCI format information, a beta offset indicator, the number of DMRS ports, and modulation and coding scheme (MCS) information. The 2nd-stage SCI may include one or more information elements among a HARQ processor identifier (ID), a redundancy version (RV), a source ID, a destination ID, CSI request information, a zone ID, and communication range requirements.

In exemplary embodiments, 'configuring an operation (e.g., DRX operation)' may refer to signaling of 'configuration information (e.g., information elements, parameters)

for the operation' and/or 'information instructing to perform the operation'. 'Configuring an information element (e.g., parameter)' may mean that the information element is signaled. The signaling may be at least one of system information (SI) signaling (e.g., transmission of a system information block (SIB) and/or master information block (MIB)), RRC signaling (e.g., transmission of an RRC parameter and/or higher layer parameter), MAC control element (CE) signaling, or PHY signaling (e.g., transmission of downlink control information (DCI), uplink control information (UCI), and/or sidelink control information (SCI)). Here, a MAC CE signaling operation may be performed through a data channel, a PHY signaling operation may be performed through a control channel or a data channel, and transmission of SCI may refer to transmission of 1st-stage SCI and/or $2^{nd}$-stage SCI.

In exemplary embodiments, a transmitting terminal may refer to a terminal transmitting SL data, and a receiving terminal may refer to a terminal receiving the SL data. The receiving terminal may support SL discontinuous reception (DRX). An operation mode of the receiving terminal supporting SL DRX may transition from a non-communication mode to a communication mode at a specific time, and the receiving terminal operating in the communication mode may perform a channel and/or signal reception operation. The non-communication mode may refer to a mode in which the receiving terminal does not perform communication (e.g., reception operation). For example, the non-communication mode may be an inactive mode, idle mode, or sleep mode. The communication mode may refer to a mode in which the receiving terminal performs communication (e.g., reception operation). For example, the communication mode may be a wake-up mode, connected mode, or active mode.

Figure 7:
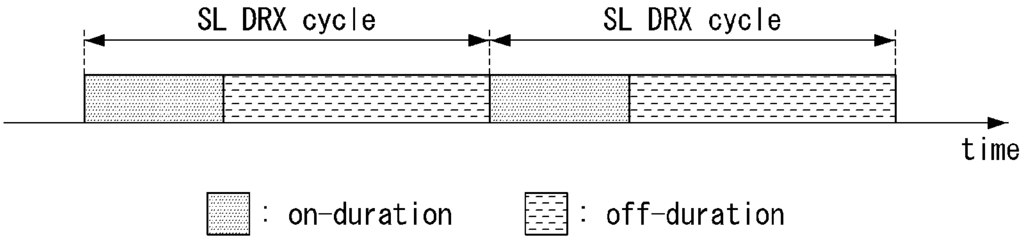
FIG. 7 is a conceptual diagram illustrating a first exemplary of a SL DRX cycle.

FIG. 7 is a conceptual diagram illustrating a first exemplary embodiment of a SL DRX cycle.

As shown in FIG. 7, a base station may configure (e.g., signal) SL DRX configuration information to terminal(s). The SL DRX configuration information may include at least one of information on a SL DRX cycle, on-duration information, or off-duration information. The terminal(s) may receive the SL DRX configuration information from the base station, and may identify the SL DRX cycle, on-duration, and/or off-duration based on information element(s) included in the SL DRX configuration information.

A receiving terminal may operate according to the SL DRX cycle. For example, an operation mode of the receiving terminal may be transitioned according to the SL DRX cycle. The SL DRX cycle may mean an interval between times at which the operation mode of the receiving terminal transitions to the wake-up mode. The receiving terminal may operate in the wake-up mode during the on-duration within the SL DRX cycle and operate in the sleep mode during the off-duration within the SL DRX cycle. The receiving terminal operating in the wake-up mode may perform a monitoring operation for signal reception.

A longer DRX cycle may mean a longer time interval at which the receiving terminal wakes up. When SL DRX is applied from the perspective of a transmitting terminal, the transmitting terminal may wake up for transmission according to the DRX cycle. For example, when there is SL data to be transmitted to the receiving terminal, the transmitting terminal may attempt to transmit the SL data in consideration of the DRX cycle. The receiving terminal may attempt to receive the SL data according to the DRX cycle.

In sidelink communication, a terminal may transmit feedback information (e.g., hybrid automatic repeat request (HARQ) response) according to a PSFCH periodicity. In addition, a terminal may perform a reception operation of feedback information according to the PSFCH periodicity. When a PSFCH is located in the on-duration within the SL DRX cycle, the terminal may receive the feedback information through a PSFCH. On the other hand, when a PSFCH is located in the off-duration within the SL DRX cycle, the terminal may not be able to receive feedback information through the PSFCH. To save power of the terminal, the PSFCH may be configured with a long periodicity. In this case, considering the PSFCH periodicity and the SL DRX cycle, transmission and reception of feedback information on the sidelink may not be performed efficiently.

In sidelink communication, a terminal may perform a SL DRX operation to save power. In this case, the terminal may perform the SL DRX operation based on DRX configuration information (e.g., drx-Config, shortDRX-Cycle, drx-ShortCycle, longDRX-CycleStart Offset, drx-LongCycleStartOffset, etc.) configured for a DRX operation on a Uu link (hereinafter, 'Uu DRX operation'). In the LTE communication system, the DRX configuration information may be configured as shown in Tables 3 to 5 below. Information element(s) (e.g., parameter(s)) defined in Tables 4 and 5 may be included in DRX-Config of Table 3. In the LTE communication system, the base station may transmit the DRX configuration information defined in Tables 3 to 5 below to the terminal using higher layer signaling, and the terminal may perform a DRX operation using the DRX configuration information received from the base station.

TABLE 3

| | |
|---|---|
| DRX-Config ::= | CHOICE { |
| release | NULL, |
| setup | SEQUENCE { |
| onDurationTimer | ENUMERATED { psf1, psf2, psf3, psf4, psf5, psf6, psf8, psf10, psf20, psf30, psf40, psf50, psf60, psf80, psf100, psf200}, |
| drx-Inactivity Timer | ENUMERATED { psf1, psf2, psf3, psf4, psf5, psf6, psf8, psf10, psf20, psf30, psf40, psf50, psf60, psf80, psf100, psf200, psf300, psf500, psf750, psf1280, psf1920, psf2560, psf0-v1020, spare9, spare8, spare7, spare6, spare5, spare4, spare3, spare2, spare1}, |
| drx-RetransmissionTimer | ENUMERATED { psf1, psf2, psf4, psf6, psf8, psf16, psf24, psf33}, |

TABLE 4

| | |
|---|---|
| longDRX-CycleStartOffset | CHOICE { |
| sf10 | INTEGER(0..9), |
| sf20 | INTEGER(0..19), |
| sf32 | INTEGER(0..31), |
| sf40 | INTEGER(0..39), |
| sf64 | INTEGER(0..63), |
| sf80 | INTEGER(0..79), |
| sf128 | INTEGER(0..127), |
| sf160 | INTEGER(0..159), |
| sf256 | INTEGER(0..255), |
| sf320 | INTEGER(0..319), |
| sf512 | INTEGER(0..511), |
| sf640 | INTEGER(0..639), |
| sf1024 | INTEGER(0..1023), |
| sf1280 | INTEGER(0..1279), |
| sf2048 | INTEGER(0..2047), |
| sf2560 | INTEGER(0..2559) |

TABLE 4-continued

```
    },
```

TABLE 5

```
shortDRX                    SEQUENCE {
      shortDRX-Cycle          ENUMERATED   {
                              sf2, sf5, sf8, sf10, sf16, sf20,
                              sf32, sf40, sf64, sf80, sf128,
sf160,
                              sf256, sf320, sf512, sf640},
      drxShortCycleTimer      INTEGER (1..16)
   }      OPTIONAL              --
Need OR
  }
}
```

In the NR communication system, DRX configuration information may be configured as shown in Tables 6 to 9 below. Information element(s) (e.g., parameter(s)) defined in Tables 7 to 9 may be included in DRX-Config of Table 6. In the NR communication system, the base station may transmit the DRX configuration information defined in Tables 6 to 9 below to the terminal using higher layer signaling, and the terminal may perform a DRX operation using the DRX configuration information received from the base station.

TABLE 6

```
DRX-Config ::=              SEQUENCE {
  drx-onDurationTimer         CHOICE {
                                subMilliSeconds INTEGER
(1..31),
                                milliSeconds
ENUMERATED {
                                  ms1, ms2, ms3, ms4,
ms5, ms6, ms8, ms10, ms20, ms30, ms40, ms50, ms60,
                                  ms80, ms100, ms200,
ms300, ms400, ms500, ms600, ms800, ms1000, ms1200,
                                  ms1600, spare8,
spare7, spare6, spare5, spare4, spare3, spare2, spare1 }
                                },
  drx-InactivityTimer         ENUMERATED {
                                ms0, ms1, ms2, ms3, ms4,
ms5, ms6, ms8, ms10, ms20, ms30, ms40, ms50, ms60, ms80,
                                ms100, ms200, ms300,
ms500, ms750, ms1280, ms1920, ms2560, spare9, spare8,
                                spare7, spare6, spare5,
spare4, spare3, spare2, spare1},
```

TABLE 7

```
drx-HARQ-RTT-TimerDL          INTEGER (0..56),
  drx-HARQ-RTT-TimerUL          INTEGER (0..56),
  drx-RetransmissionTimerDL     ENUMERATED {
                                  sl0, sl1, sl2, sl4, sl6, sl8,
sl16, sl24, sl33, sl40, sl64, sl80, sl96, sl112, sl128,
                                  sl160, sl320, spare15,
spare14, spare13, spare12, spare11, spare10, spare9,
                                  spare8, spare7, spare6,
spare5, spare4, spare3, spare2, spare1},
  drx-RetransmissionTimerUL     ENUMERATED {
                                  sl0, sl1, sl2, sl4, sl6, sl8,
sl16, sl24, sl33, sl40, sl64, sl80, sl96, sl112, sl128,
                                  sl160, sl320, spare15,
spare14, spare13, spare12, spare11, spare10, spare9,
                                  spare8, spare7, spare6,
spare5, spare4, spare3, spare2, spare1 },
```

TABLE 8

```
drx-LongCycleStartOffset      CHOICE {
    ms10                        INTEGER(0..9),
    ms20                        INTEGER(0..19),
    ms32                        INTEGER(0..31),
    ms40                        INTEGER(0..39),
    ms60                        INTEGER(0..59),
    ms64                        INTEGER(0..63),
    ms70                        INTEGER(0..69),
    ms80                        INTEGER(0..79),
    ms128                       INTEGER(0..127),
    ms160                       INTEGER(0..159),
    ms256                       INTEGER(0..255),
    ms320                       INTEGER(0..319),
    ms512                       INTEGER(0..511),
    ms640                       INTEGER(0..639),
    ms1024                      INTEGER(0..1023),
    ms1280                      INTEGER(0..1279),
    ms2048                      INTEGER(0..2047),
    ms2560                      INTEGER(0..2559),
    ms5120                      INTEGER(0..5119),
    ms10240                     INTEGER(0..10239)
  },
```

TABLE 9

```
drx-ShortCycle                ENUMERATED {
                                ms2, ms3, ms4, ms5,
ms6, ms7, ms8, ms10, ms14, ms16, ms20, ms30, ms32,
                                ms35, ms40, ms64,
ms80, ms128, ms160, ms256, ms320, ms512, ms640, spare9,
                                spare8, spare7, spare6,
spare5, spare4, spare3, spare2, spare1 },
    drx-ShortCycleTimer         INTEGER (1..16)
  }
OPTIONAL,   -- Need R
  drx-SlotOffset                INTEGER (0..31)
}
```

In the LTE communication system, a short cycle (e.g., shortDRX-Cycle) for the Uu DRX operation may be set to 2, 5, 8, 10, 16, 20, 32, 40, 64, 80, 128, 160, 256, 320, 512, or 640 subframes. In the NR communication system, a short cycle (e.g., drx-ShortCycle) for the Uu DRX operation may be set to 2, 3, 4, 5, 6, 7, 8, 10, 14, 16, 20, 30, 32, 35, 40, 64, 80, 128, 160, 256, 320, 512, or 640 milliseconds (ms). In the LTE communication system, the length of a subframe may be 1 ms. Therefore, in the LTE communication system and the NR communication system, the minimum length of the short cycle for the Uu DRX operation may be 2 ms, and the maximum length of the short cycle for the Uu DRX operation may be 640 ms.

In the LTE communication system, a long cycle (e.g., longDRX-CycleStartOffset) for the Uu DRX operation may be set to 10, 20, 32, 40, 64, 80, 128, 160, 256, 320, 512, 640, 1024, 1280, 2048, or 2560 subframes. In the NR communication system, a long cycle (e.g., drx-LongCycleStartOffset) for the Uu DRX operation may be 10, 20, 32, 40, 64, 70, 80, 128, 160, 256, 320, 512, 640, 1024, 1280, 2048, 2560, 5120, or 10240 ms. In the LTE communication system, the minimum length of the long cycle for the Uu DRX operation may be 10 ms, and the maximum length of long cycle for the Uu DRX operation may be 2560 ms. In the NR communication system, the minimum length of the long cycle for the Uu DRX operation may be 10 ms, and the maximum length of the long cycle for the Uu DRX operation may be 10240 ms.

The aforementioned DRX configuration information (e.g., configuration information for the Uu DRX operation) may be used for the SL DRX operation. The DRX configuration information may be applied differently depending on whether reception of a PSFCH (e.g., feedback information or HARQ response) is enabled. When the terminal receives a PSFCH (e.g., when a HARQ feedback operation is enabled on the sidelink), the terminal may be configured to receive a PSFCH in the on-duration within the SL DRX cycle.

The PSFCH may be configured periodically. The base station may transmit information (e.g., sl-PSFCH-Period) on a periodicity of the PSFCH to the terminal using higher layer signaling. When configured as sl-PSFCH-Period=2, the terminal(s) (e.g., terminal(s) using a resource pool to which sl-PSFCH-Period is applied) may determine that a PSFCH exists every 2 slots (e.g., every 2 ms when the length of one slot is 1 ms), and perform a monitoring operation every 2 slots (e.g., 2 ms) for reception of a PSFCH (e.g., feedback information). In this case, the SL DRX cycle may be set considering sl-PSFCH-Period (e.g., 0, 1, 2, or 4). For example, the SL DRX cycle may be set to 2 ms or 4 ms.

The base station may set the SL DRX cycle in consideration of sl-PSFCH-Period, and may configure (e.g., signal) SL DRX configuration information including information on the SL DRX cycle to the terminal(s). The SL DRX cycle may be set equal to the PSFCH periodicity. Alternatively, the SL DRX cycle may be set to a multiple by N of the PSFCH periodicity. N may be a rational number. The terminal(s) may receive the SL DRX configuration information from the base station and may identify the SL DRX cycle included in the SL DRX configuration information. The SL DRX cycle may be referred to as drx-sl-Cycle. drx-sl-Cycle may be set to 2 ms or 4 ms.

Alternatively, as shown in Table 10 below, drx-sl-Cycle may be set based on sl-PSFCH-Period. A mapping relationship (e.g., mapping table) between drx-sl-Cycle and sl-PSFCH-Period may be preconfigured in the communication nodes (e.g., base station and/or terminal). In order to indicate ‘drx-sl-Cycle=2’ when the SL DRX operation is performed, the base station may inform the terminal(s) of sl-PSFCH-Period set to sl2 (e.g., 2 slots). When the SL DRX operation is performed and sl-PSFCH-Period is set to sl2, the terminal (s) may determine that the SL DRX cycle (e.g., drx-sl-Cycle) is 2 ms based on the mapping relationship. In order to indicate ‘drx-sl-Cycle=4’ when the SL DRX operation is performed, the base station may inform the terminal(s) of sl-PSFCH-Period set to sl4 (e.g., 4 slots). When the SL DRX operation is performed and sl-PSFCH-Period is set to sl4, the terminal(s) may determine that the SL DRX cycle (e.g., drx-sl-Cycle) is 4 ms based on the mapping relationship.

TABLE 10

| sl-PSFCH-Period | drx-sl-Cycle |
|---|---|
| sl0 | — |
| sl1 | — |
| sl2 | ms2 |
| sl4 | ms4 |

When a PSFCH overhead indicator is set to 1 and sl-PSFCH-Period is set to 2 or 4, the PSFCH periodicity (e.g., sl-PSFCH-Period) and the SL DRX cycle (e.g., drx-sl-Cycle) may be set identically. When a PSFCH exists for each slot (e.g., when sl-PSFCH-Period=1), the SL DRX operation may not be configured. That is, the SL DRX operation may not be performed.

When a PSFCH is not configured (e.g., when sl-PSFCH-Period=0), the SL DRX cycle may be set to a different value from the SL DRX cycle associated with (e.g., mapped) to the PSFCH periodicity. For example, when drx-sl-Cycle can be set to 2, 4, or A ms, drx-sl-Cycle may be set to 2 ms or 4 ms if a PSFCH is configured, and drx-sl-Cycle may be set to A ms if a PSFCH is not configured. A may be a natural number.

According to the above-described exemplary embodiments, the terminal performing the SL DRX operation may wake up at least every 4 ms to receive the PSFCH. In order to save power of the terminal, configuring the PSFCH with a long periodicity may be considered. For the terminal requiring a power saving operation (e.g., terminal performing the SL DRX operation), a new PSFCH periodicity longer than the existing PSFCH periodicity may be introduced. The new PSFCH periodicity may exceed 4 ms. For example, the new PSFCH periodicity may be 10 ms, and the SL DRX cycle may be set in consideration of the new PSFCH periodicity (e.g., 10 ms). In this case, the SL DRX cycle (e.g., drx-sl-Cycle) may be set to 2, 4, or 10 ms. Information on the new PSFCH periodicity may be configured (e.g., signaled) from the base station to the terminal(s).

Meanwhile, only a specific SL DRX cycle may be set to save power of the terminal. For example, SL DRX cycle(s) may be set in a resource pool-specific manner. A first set of SL DRX cycle(s) may be set for a first resource pool, and a second set of SL DRX cycle(s) may be set for a second resource pool. Each of the first set and the second set may include one or more SL DRX cycles. The base station may configure (e.g., signal) information on a set of SL DRX cycle(s) for each resource pool to the terminal(s). The terminal(s) may identify the set of SL DRX cycle(s) for each resource pool based on the information received from the base station. When the SL DRX cycle for the first resource pool is X ms, the terminal may perform a PSFCH reception operation according to a periodicity of X ms in the first resource pool. In this case, the PSFCH periodicity may be X ms, and ‘PSFCH periodicity=X ms’ may be set only in the first resource pool. X may be a natural number.

Alternatively, SL DRX cycle(s) may be set in a UE-specific manner. A first set of SL DRX cycle(s) may be set for a first terminal, and a second set of SL DRX cycle(s) may be set for a second terminal. Each of the first set and the second set may include one or more SL DRX cycles. The base station may configure (e.g., signal) information on a set of SL DRX cycle(s) for each terminal to the terminal(s). The terminal(s) may identify the set of SL DRX cycle(s) for each terminal based on the information received from the base station.

When the terminal does not receive a PSFCH, drx-sl-Cycle may be set to 0. The transmitting terminal (e.g., terminal receiving a PSFCH) may set a long PSFCH periodicity in order to save power of the receiving terminal (e.g., terminal transmitting a PSFCH) in a PSFCH transmission procedure, and configure (e.g., signal) information of the PSFCH periodicity to the receiving terminal. For example, the PSFCH periodicity may be set longer than 4 slots. The PSFCH periodicity set for the receiving terminal may be used as a SL DRX cycle when a SL DRX operation is performed.

The above-described SL DRX configuration method (e.g., SL DRX cycle setting method) may be applied to terminal(s) transmitting and receiving a PSFCH. The above-described SL DRX configuration method (e.g., SL DRX cycle setting method) may be applied differently to terminal(s) transmitting and receiving a PSFCH. The terminal(s) transmitting and receiving a may be terminal(s) for which a HARQ feedback operation on the sidelink is enabled, and the terminal(s) not transmitting and receiving a PSFCH may be terminal(s) for which a HARQ feedback operation on the sidelink is disabled. In the above-described exemplary embodiments, the SL DRX cycle may be interpreted as a SL short DRX cycle or a SL long DRX cycle.

The above-described SL DRX operation, SL DRX cycle information, and/or PSFCH periodicity information may be configured specifically, independently, or commonly based on at least one of a resource pool, service type, priority, whether a power saving operation is performed, QoS parameters (e.g., reliability, latency), cast type, or terminal type (e.g., V-UE or pedestrian (P)-UE). The above-described configuration may be performed by the network and/or base station. Alternatively, the above-described operation (e.g., selection operation of the method) of the terminal (e.g., UE-A and/or UE-B) may be implicitly determined based on preset parameter(s).

In the above-described exemplary embodiments, whether to apply each method (e.g., each rule) may be configured based on at least one of a condition, combination of conditions, parameter, or combination of parameters. Whether to apply each method may be configured by the network and/or base station. Whether to apply each method may be configured in a resource pool or service specific manner. Alternatively, whether to apply each method may be configured by PC5-RRC signaling between terminals.

Meanwhile, in sidelink communication, a plurality of HARQ responses may be multiplexed on one PSFCH. The base station may configure (e.g., signal) PSFCH multiplexing information to the terminal(s). The terminal(s) may receive the PSFCH multiplexing information from the base station. The PSFCH multiplexing information may include one or more information elements defined in Table 11 below. The PSFCH multiplexing information may be included in the PSFCH configuration information. The PSFCH configuration information may be configured (e.g., signaled) from the base station to the terminal(s), and may include at least one of a PSFCH periodicity, PSFCH multiplexing indicator, or maximum number of multiplexing. Alternatively, the maximum number of multiplexing may be preconfigured in the communication nodes (e.g. base station, terminal). For example, the maximum number of multiplexing be set for each resource pool.

TABLE 11

| | Description |
|---|---|
| PSFCH multiplexing indicator | The PSFCH multiplexing indicator set to a first value (e.g., 0) may indicate that multiplexing of a plurality of HARQ responses on one PSFCH is not allowed. The PSFCH multiplexing indicator set to a second value (e.g., 1) may indicate that multiplexing of a plurality of HARQ responses on one PSFCH is allowed. |
| The maximum number of multiplexing | The maximum number of multiplexing may indicate the number of HARQ responses multiplexed on the one PSFCH (or, the maximum number of HARQ responses that can be multiplexed on one PSFCH). |

When the PSFCH multiplexing indicator indicates that multiplexing of a plurality of HARQ responses on one PSFCH is not allowed, the SL DRX cycle may be determined based on the exemplary embodiment according to Table 10 described above. When the PSFCH multiplexing indicator indicates that multiplexing of a plurality of HARQ responses is allowed on one PSFCH, the SL DRX cycle may be set in consideration of the PSFCH periodicity and the maximum number of multiplexing.

Figure 8:
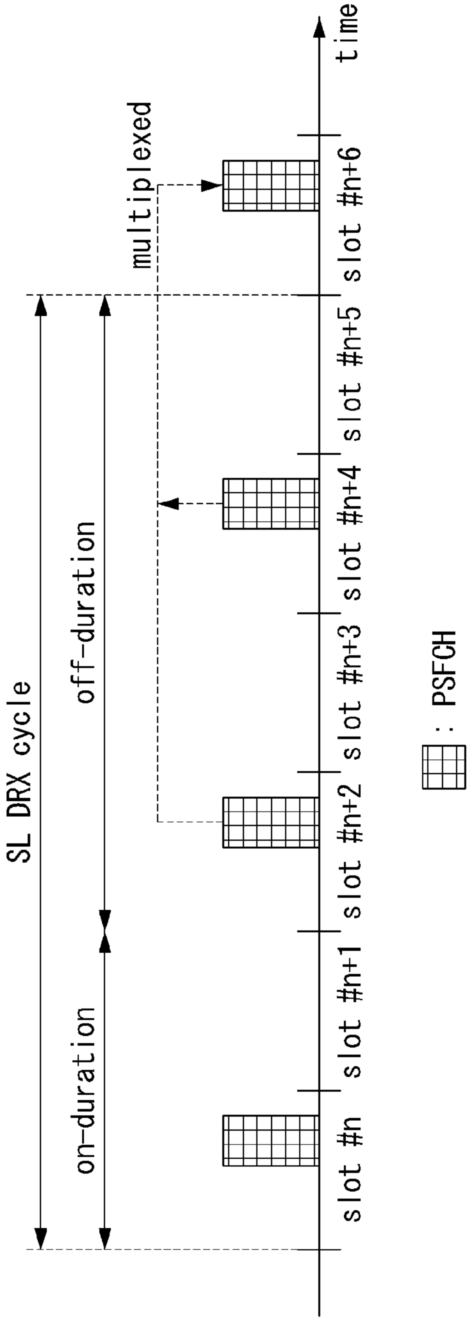
FIG. 8 is a conceptual diagram illustrating a second exemplary of a SL DRX cycle.

FIG. 8 is a conceptual diagram illustrating a second exemplary embodiment of a SL DRX cycle.

As shown in FIG. 8, when multiplexing of HARQ responses is allowed, the PSFCH periodicity is 2 slots, and the maximum number of multiplexing is 3, the SL DRX cycle (e.g., the maximum length of the SL DRX cycle) may be set to [PSFCH periodicity×the maximum number of multiplexing]. In this case, the SL DRX cycle may be 6 slots, and PSFCHs located in slots #n, #n+6, #n+12, etc. may belong to the on-durations of the SL DRX cycles. The base station may determine the SL DRX cycle based on the PSFCH periodicity and the maximum number of multiplexing, and configure (e.g., signal) SL DRX configuration information including information on the SL DRX cycle to the terminal(s).

Alternatively, when the SL DRX operation is performed, multiplexing of HARQ responses is allowed, and the PSFCH periodicity and the maximum number of multiplexing are set in the terminal(s), the terminal(s) may determine the SL DRX cycle based on the PSFCH periodicity and the maximum number of multiplexing, and perform a SL DRX operation based on the SL DRX cycle. In this case, the base station may not explicitly configure (e.g., signal) information on the SL DRX cycle to the terminal. The above-described SL DRX operation may be applied to the terminal receiving a PSFCH.

When the SL DRX cycle is determined to be 6 slots, a first terminal may not transmit HARQ responses on PSFCHs configured in slots #n+2 and #n+4 belonging to the off-durations of the SL DRX cycles. The first terminal may transmit multiplexed HARQ responses (e.g., HARQ codebook) on a PSFCH (e.g., PSFCH located in the slot #n+6) within the on-duration of the next SL DRX cycle. The multiplexed HARQ responses may include a HARQ response for a PSFCH in the slot #n+2, a HARQ response for a PSFCH in the slot #n+4, and/or a HARQ response for a PSFCH in the slot #n+6. The HARQ responses within the HARQ codebook may be sequentially arranged according to an order of HARQ process numbers or the locations of the PSFCHs in the time domain. The arrangement method of HARQ responses within the HARQ codebook may be configured (e.g., signaled) from the base station to the terminal (s).

The second terminal may perform the SL DRX operation according to the above-described SL DRX cycle (e.g., 6 slots). The second terminal may expect the multiplexed HARQ responses (e.g., HARQ codebook) to be received on the PSFCH (e.g., PSFCH located in the slot #n+6) within the on-duration of the SL DRX cycle. When the maximum number of multiplexing is 3, the second terminal may expect the HARQ codebook to include up to 3 HARQ responses. The second terminal may interpret the HARQ responses included in the HARQ codebook based on the arranged method configured by the base station.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

The foregoing descriptions of specific exemplary embodiments of the present invention have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the present disclosure and their practical application, to enable others skilled in the art to make and utilize various exemplary embodiments of the present invention, as well as various alternatives and modifications thereof. It is intended that the scope of the present disclosure be defined by the Claims appended hereto and their equivalents.

What is claimed is:

1. A method of a base station, the method comprising:

transmitting, to a user equipment (UE), information of a physical sidelink feedback channel (PSFCH) periodicity;

determining a sidelink (SL) discontinuous reception (DRX) cycle based on the PSFCH periodicity; and transmitting information on the SL DRX cycle to the UE, wherein the SL DRX cycle is determined so that a PSFCH according to the PSFCH periodicity is located within an on-duration of the SL DRX cycle, and based on multiplexing of hybrid automatic repeat request (HARQ) responses being allowed on one PSFCH, the SL DRX cycle is set as a product of the PSFCH periodicity and a maximum number of HARQ responses multiplexed on the one PSFCH.

2. The method of claim 1, wherein the SL DRX cycle is set equal to the PSFCH periodicity or set to a multiple by N of the PSFCH periodicity, and the N is a rational number.

3. The method of claim 1, wherein the PSFCH periodicity is 1 slot, 2 slots, 4 slots, or X slots, and the X is a natural number of 5 or more.

4. The method of claim 1, further including: transmitting, to the UE, information indicating that multiplexing of HARQ responses is allowed and information indicating the maximum number of HARQ responses multiplexed on the one PSFCH.

5. A method of a user equipment (UE), the method comprising:

receiving, from a base station, information of a physical sidelink feedback channel (PSFCH) periodicity;

receiving, from the base station, information on a sidelink (SL) discontinuous reception (DRX) cycle determined based on the PSFCH periodicity; and performing a SL DRX operation based on the SL DRX cycle, wherein the SL DRX cycle is determined so that a PSFCH according to the PSFCH periodicity is located within an on-duration of the SL DRX cycle, and based on multiplexing of hybrid automatic repeat request (HARQ) responses being allowed on one PSFCH, the SL DRX cycle is set as a product of the PSFCH periodicity and a maximum number of HARQ responses multiplexed on the one PSFCH.

6. The method of claim 5, wherein the SL DRX cycle is set equal to the PSFCH periodicity or set to a multiple by N of the PSFCH periodicity, and the N is a rational number.

7. The method of claim 5, wherein the PSFCH periodicity is 1 slot, 2 slots, 4 slots, or X slots, and the X is a natural number of 5 or more.

8. A method of a user equipment (UE), the method comprising:

receiving physical sidelink feedback channel (PSFCH) configuration information from a base station;

determining a sidelink (SL) discontinuous reception (DRX) cycle based on a PSFCH periodicity indicated by the PSFCH configuration information; and performing a SL DRX operation based on the SL DRX cycle, wherein the SL DRX cycle is determined so that a PSFCH according to the PSFCH periodicity is located within an on-duration of the SL DRX cycle, and based on multiplexing of hybrid automatic repeat request (HARQ) responses being allowed on one PSFCH, the SL DRX cycle is set as a product of the PSFCH periodicity and a maximum number of HARQ responses multiplexed on the one PSFCH.

9. The method of claim 8, wherein the SL DRX cycle is set equal to the PSFCH periodicity or set to a multiple by N of the PSFCH periodicity, and the N is a rational number.

10. The method of claim 8, wherein the PSFCH configuration information includes information indicating that multiplexing of HARQ responses is allowed and information indicating the maximum number of HARQ responses multiplexed on the one PSFCH.

* * * * *